Feb. 23, 1926. Re. 16,274

R. MATTICE

METHOD OF WELDING METALLIC STRUCTURES

Original Filed Feb. 9, 1924

Inventor

Royal Mattice

By Donald U. Rich

Attorney

Reissued Feb. 23, 1926. Re. 16,274

UNITED STATES PATENT OFFICE.

ROYAL MATTICE, OF BETHLEHEM, PENNSYLVANIA.

METHOD OF WELDING METALLIC STRUCTURES.

Original No. 1,515,692, dated November 18, 1924, Serial No. 691,640, filed February 9, 1924. Application for reissue filed January 15, 1926. Serial No. 81,572.

*To all whom it may concern:*

Be it known that I, ROYAL MATTICE, a citizen of the United States, residing at Bethlehem, in the county of Northampton and State of Pennsylvania, have invented certain new and useful Improvements in Methods of Welding Metallic Structures, of which the following is a specification.

This invention relates to welding processes for firmly uniting or joining adjacent portions of a metallic structure and has more particularly been produced so that a broken or fractured structure can be restored to satisfactory service condition.

One of the principal objects of the invention, generally stated, is to provide a comparatively simple and effective welding method for repairing broken, cracked or fractured metallic structures at very low cost, thus rendering the structure fit for further use and capable of withstanding all strains to which it may be subjected according to service conditions imposed thereon.

Particularly stated, the invention consists in providing a method of repairing metallic structures subject to relatively high and rapid fluctuations in temperature, means being provided whereby the cracked or fractured portion of the structure is suitably closed against leakage and the severe internal stresses of the metal adjacent the crack or fracture are transferred to a metallic member or bar disposed so as to bridge the crack or fracture. By "bridge" I mean so positioned that the major portion of the metallic member spans the fracture in contradistinction to the arrangement shown in British patent to Jones 159,914 of 1921 in which the member used really is formed into an integral part of the fractured structure. Heretofore it has been customary to weld the metal adjacent the crack into nearly a homogeneous cross section as possible but this has been found to be objectionable in that the metal in and adjacent the weld is subjected to very high stresses as the result of expansion and contraction, thus causing the structure when again subjected to relative wide variations in temperature to again crack. An example of this type of repair is shown in the British patent to Jones 159,914 of 1921. An advantage of the present invention is to provide means other than the weld to accomplish the desired result, said means permitting of the elastic deformation or action of the metal as the result of the exceedingly high temperature. It has been found that the impurities, and more particularly the high sulphur content of cast metal, precludes an effective welding thereof which will stand up under continued usage. This is particularly true of cinder pots or ladles and other metallic receptacles used in steel mills, chemical factories and other places where the range of temperatures is exceedingly great. The high temperature to which the pot or ladle is raised by reason of the molten metal, together with the relative rapid cooling thereof imposes upon the metal such internal stress as to frequently cause the same to crack or fracture, and as the expense in replacing these pots or ladles is exceedingly great it is highly desirable to repair them. Accordingly, I have found in practice that U-shaped members can be effectively used to bridge or span the crack or fracture, said members having portions thereof electrically welded in and to the adjacent portions of the structure, said members acting to carry the strain and relieve the weld at the crack which latter is utilized to seal the crack or fracture against leakage.

In the drawings which have been chosen to illustrate an application of the welding process to cinder pots or ladles:

Figure 1:
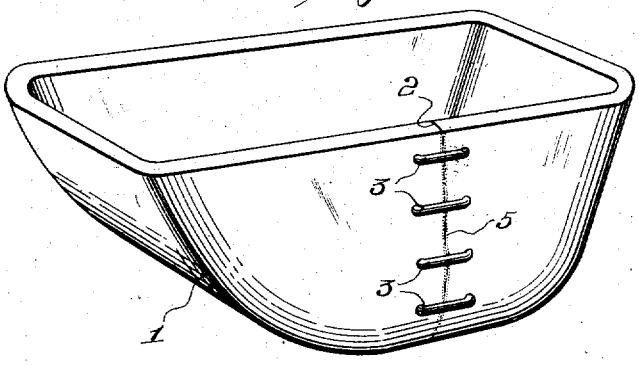
Figure 1 is a perspective view of a cracked cinder pot or cinder ladle showing the same repaired according to the present invention.
Figure 2:
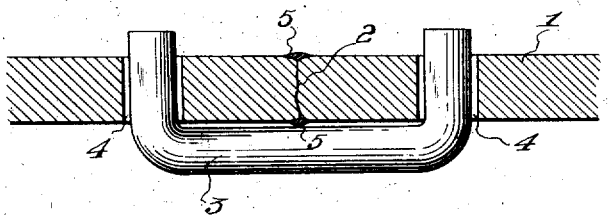
Figure 2 is a detail horizontal sectional view illustrating portions of the metal upon opposite sides of the crack or fracture suitably perforated to receive the bent ends of the U-shaped member shown in position therein, the crack or fracture being shown welded and closed against leakage.

In carrying out my present method of uniting adjacent metallic members or repairing a cracked or fractured metallic structure such as illustrated in the drawings by way of example, the relative thickness of the metallic structure is determined and the wide fluctuations of temperatures to which the same is subjected in service is obtained, from which data the size of the connecting member is calculated. In the present case the members or bars, and more particularly the cross-sectional area thereof, bear a stress relation to the metal of the structure lying between the crack and the openings or recesses receiving the respective bent ends of the bar. I have found that it is desirable to locate the openings upon each side of the crack a distance therefrom corresponding substantially to twice the diameter of the bar, measured from the inner side of the opening to the crack.

The crack in the cinder pot 1 is shown at 2, said crack extending the full height of one wall and necessitating by reason of the length thereof a plurality of bars or U-shaped members 3 to effectively absorb the expansion and contraction of the metal. The openings or recesses 4 which receive the projections or bent ends of the connecting bars are shown as extending through the wall. This may be said to be the preferred method, but it will be understood that these openings are not so limited and may be formed by simply recessing said walls a distance sufficient to insure the necessary anchorage of the projections or bent ends of the bar spanning the crack. The openings are preferably formed by using an acetylene torch although they may be produced by drilling, punching or otherwise cutting the same, as may be most convenient.

Figure 3:
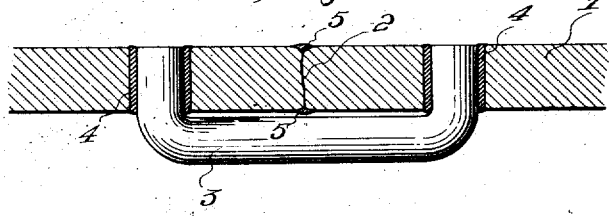
Figure 3 is a view similar to Figure 2, showing the U-shaped member firmly secured in completely assembled position.

The bent ends or projections on the connecting bars are adapted to be inserted in said openings or recesses and subsequently welded therein, the innermost projecting ends thereof being cut off in any suitable manner and welded flush with the inner face of the wall being repaired as indicated in Figure 3. While I have shown the bar 3 as of circular cross section, it will be understood that various other shapes of bars may be utilized, such for example as flat, square, hexagonal and octagonal bars, it being observed, however, that the cross-sectional area thereof is so computed as to provide adequate strength to resist the shear strains and being of such quality as to compensate for all tension and compressive forces to which the bar may be subjected under the wide fluctuations of temperatures.

The sealing of the crack is effected by welding the same as indicated at 5, said weld being designed to prevent leakage or escape of the material from the pot or ladle, the nature of said weld being such that it forms a strong bond or joint capable of responding to the expansion and contraction of the metal without giving away.

Electric welding apparatus is preferably utilized to effect the securing of the connecting metallic member or bar to the structure, the intermediate portion of said bar lying between the portions welded upon each side of the crack or fracture being maintained free from attachment to the structure. It will also be observed that the openings are spaced from the crack or fracture a distance such that the intervening portion of the structure or article being welded has a cross-sectional area exceeding the cross-sectional area of the connecting bar.

According to the present invention abutted metallic members which are subjected in use to comparatively wide fluctuations in temperatures can be effectively united, the joint at the junction of said members being merely sealed if it is to resist leakage, and the principal stresses and strains incident to the expansion and contraction of the metal in the abutted members being delivered to the metallic connecting member bridging the joint.

Changes appropriate to the successful carrying out of the invention may be resorted to in conformity with the work in hand and such departures from the exact description herein may be made without exceeding the scope of the invention which follows.

Having thus described my invention, what I claim as new and desire to secure by Letters Patent, is:

1. The method of connecting abutting metallic members which are subjected in use to comparatively wide fluctuations of temperature, which involves forming an opening in each of said members, said openings being disposed in spaced relation on opposite sides of the abutting faces of said members, assembling with said members a metallic connecting element having angular projections respectively adapted to enter said openings, said projections being entered in said openings, and securing said connecting element in assembled relation to said members so as to retain said projections in said openings.

2. The method of connecting abutting metallic members which are subjected in use to comparatively wide fluctuations of temperature, which involves forming an opening in each of said members, said openings being disposed in spaced relation on opposite sides of the abutting faces of said members, assembling with said members a metallic connecting element having angular projections respectively adapted to enter said openings, said projections being entered in said openings, and securing said connecting element in assembled relation to said members so as to retain said projections in said openings, the portion of said connecting element extending across the abutting faces of said members being free of immediate attachment to said members.

3. The method of connecting abutting metallic members which are subjected in use to comparatively wide fluctuations of temperature, which involves forming an opening in each of said members, said openings being disposed in spaced relation on opposite sides of the abutting faces of said members, assembling with said members a metallic connecting device having angular projections respectively adapted to enter said openings, said projections being entered in said openings, and welding said projections in place in said openings.

4. The method of connecting abutting metallic members which are subjected in use to comparatively wide fluctuations of temperature which involves sealing the joint formed at the junction of the metallic members, forming openings in said members upon opposite sides of the sealed joint and in spaced relation therefrom, assembling with said members a metallic connecting device having angular end portions adapted to enter said openings, said portions being entered in said openings, and welding said angular end portions in place in said openings.

5. The method of repairing cracked or fractured metallic devices which are subjected in use to comparatively wide fluctuations of temperature, which involves forming in said device a plurality of openings disposed on opposite sides of the crack or fracture, assembling with said device a metallic connecting element having angular projections respectively adapted to enter said openings, said projections being inserted in said openings, welding said projections in place so as to seal said openings, and sealing the crack or fracture.

6. The method of repairing cracked or fractured metallic devices which are subjected in use to comparatively wide fluctuations of temperature, which involves forming in said device a plurality of openings disposed on opposite sides of the crack or fracture, assembling with said device a metallic connecting element having angular projections respectively adapted to enter said openings, said projections being inserted in said openings, securing said projections in place in said openings, so as to seal the latter, and sealing the crack or fracture by welding.

7. In means for repairing cracked or fractured metallic articles, the combination with an article of the character indicated having a plurality of openings disposed on opposite sides of the crack or fracture therein, of a metallic connecting member having angular projections respectively extending into said openings, and means for securing said projections in said openings, said securing means forming a weld uniting said connecting member to said metallic article.

8. In means for repairing cracked or fractured metallic articles, the combination with an article of the character indicated having a plurality of openings disposed on opposite sides of the crack or fracture therein, of a metallic connecting member having angular projections respectively extending into said openings, means for securing said projections in said openings, said securing means forming welds uniting said connecting members to said metallic article, and metallic means welded to said article for sealing the crack or fracture therein.

9. In means for repairing cracked or fractured metallic articles, the combination with an article of the character indicated having a plurality of openings disposed on opposite sides of the crack or fracture therein, of a U-shaped metallic connecting member having its ends respectively extending into said openings, and metallic means for securing the ends of said U-shaped member in place, said securing means forming welds uniting said connecting members to said metallic article.

10. In means for repairing cracked or fractured metallic articles, the combination with an article of the character indicated having a plurality of openings disposed on opposite sides of the crack or fracture therein, of a U-shaped metallic connecting member having its ends respectively extending into said openings, and means for securing the ends of said U-shaped member in place in said openings, said securing means serving to seal said openings, and each of said openings being spaced from the crack or fracture a distance such that the intervening portion of the article has a cross-sectional area exceeding the cross-sectional area of the said U-shaped member.

11. In means for repairing cracked or fractured metallic articles, the combination with an article of the character indicated having a plurality of openings disposed on opposite sides of the crack or fracture therein, of a metallic connecting member having its ends respectively extending into said openings, and means for securing the ends of said metallic member in place in said openings, said securing means serving to seal said openings, and each of said openings being spaced from the crack or fracture a distance such that the intervening portion of the article has a cross-sectional area exceeding the cross-sectional area of the said metallic member.

12. The method of electrically welding metallic structures which consists in applying a member disposed across the crack or fracture of the metallic structure so as to bridge said crack or fracture, and welding portions of said member to the metallic structure upon opposite sides of said crack or fracture so as to form at the welds a unitary structure whereby the internal stresses of the metal adjacent the crack are transmitted to said member.

13. The method of welding a cracked or fractured metallic structure which consists in bridging the crack or fracture by a metallic member and electrically welding said member to the structure at points located in spaced relation and upon each side of the crack or fracture in such a manner as to form at the welds a unitary structure whereby the internal stresses of the metal adjacent the crack are transmitted to said member.

14. The method of electric welding for repairing a cracked or fractured metallic structure which consists in sealing said crack or fracture by welding, and applying a metallic connecting member to the structure with portions of said member welded to the structure upon each side of the crack or fracture, the intermediate portion of said connecting member bridging said members and said crack or fracture.

15. The method of electric welding for repairing a broken metallic structure which consists in joining portions thereof adjacent the break by a sealing bond of metal and further uniting said portions by a connecting member having portions electrically welded to the structure upon opposite sides of the joint, the intermediate portion of said connecting member bridging the break in said structure.

16. The method of repairing cracked metallic structures which comprises welding the crack, forming openings on each side of the crack, assembling with the structure a metallic element with the ends thereof in said openings, and finally welding the ends of said metallic element to said structure, said metallic element being so positioned as to receive the stresses transferred from the metal of the repaired structure.

17. A welded metallic joint comprising a metallic member welded to the metal on each side of said joint, the intermediate portion of said member bridging said joint whereby the strains and stresses to which the joint is subjected are transmitted to said metallic member.

18. In means for repairing cracked or fractured metallic articles, the combination with an article of the character indicated having an opening on each side of the crack or fracture, of a metallic connecting member having the ends thereof welded to said article in the before mentioned openings, the intermediate portion of said connecting member bridging the crack or fracture.

19. A welded metallic joint comprising a metallic member welded to the metal on each side of said joint, the major portion of said metallic member bridging said joint said metallic member serving to take up the stresses and strains to which the metallic joint is subjected.

In testimony whereof I hereunto affix my signature.

ROYAL MATTICE.